US008379858B2

(12) United States Patent
Ben-Yehuda

(10) Patent No.: US 8,379,858 B2
(45) Date of Patent: Feb. 19, 2013

(54) GENERATING KEY INFORMATION FOR MUTUAL ACCESS AMONG MULTIPLE COMPUTERS

(75) Inventor: Shmuel Ben-Yehuda, Haifa (IL)

(73) Assignee: International Business Machines Corporation, Armonk, NY (US)

(*) Notice: Subject to any disclaimer, the term of this patent is extended or adjusted under 35 U.S.C. 154(b) by 2234 days.

(21) Appl. No.: 11/228,572

(22) Filed: Sep. 16, 2005

(65) Prior Publication Data
US 2007/0064935 A1 Mar. 22, 2007

(51) Int. Cl.
*H04L 29/06* (2006.01)
(52) U.S. Cl. ............................ 380/262; 380/264; 380/44
(58) Field of Classification Search .................. 380/262, 380/264, 44–47; 707/782–795
See application file for complete search history.

(56) References Cited

U.S. PATENT DOCUMENTS

| | | | |
|---|---|---|---|
| 6,839,759 B2 | 1/2005 | Larson et al. | |
| 6,851,113 B2 | 2/2005 | Hemsath | |
| 7,382,881 B2* | 6/2008 | Uusitalo et al. | 380/262 |
| 2002/0144108 A1 | 10/2002 | Benantar | |
| 2003/0167403 A1 | 9/2003 | McCurley et al. | |
| 2004/0006703 A1* | 1/2004 | Kitani et al. | 713/193 |
| 2005/0010764 A1 | 1/2005 | Collet et al. | |
| 2005/0033777 A1 | 2/2005 | Moraes et al. | |
| 2005/0060534 A1 | 3/2005 | Marvasti | |
| 2005/0071627 A1 | 3/2005 | Montenegro et al. | |
| 2005/0086342 A1 | 4/2005 | Burt et al. | |
| 2006/0059317 A1* | 3/2006 | Kakeda | 711/145 |

OTHER PUBLICATIONS

PTRACE(2). http://unixhelp.ed.ac.uk/CGI/man-cgi?ptrace+2, printed Sep. 14, 2005.*
"Using SSH Key Pairs and ssh-Agent for No Password Logins" available at http://www.phy.bnl.gov/computing/gateway/ssh-agent.html—Nov 25, 2003.
Saito et al.; "Architectural Defects of the Secure Shell", IEEE, Proceedings of the 13th International Workshop on Database and Expert Systems Applications (DEXA'02) 1529-4188/02, 2002.
Panagiotis Christias, Ptrace 2 Linux Programmer's Manual available at http://unixhelp.ed.ac.uk/CGI/man-cgi?ptrace+2,1994.
Subterfugue Project available at http://subterfugue.org/, Apr. 6, 2002.
Ben-Yehuda 2004 abstract ptrace—Playing Debugger Chess, Haifux, Dec. 2004 ? p. 6/13, http://www.mulix.org/lectures/ptrace-playing-debugger-chess/ptrace.pdf.
"*Using SSH Key Pairs and ssh-Agent for No Password Logins*" available at http://www.phy.bnl.gov/computing/gateway/ssh-agent.html Nov. 25, 2003.
Saito et al.; "*Architectural Defects of The Secure Shell*", IEEE, Proceedings of the 13th International Workshop on Database and Expert Systems Applications (DEXA '02) 1529-4188/02 2002.
Ptrace 2 Linux Programmer's Manual available at http://unixhelp.ed.ac.uk/GCI/man-cgi?ptrace+2 1994.
Subterfugue Project available at http://subterfugue.org/ Apr. 6, 2002.
Ben-Yehuda 2004 abstract http://www.haifux.org/lectures/115/.

* cited by examiner

*Primary Examiner* — Kim Vu
*Assistant Examiner* — Randal Moran
(74) *Attorney, Agent, or Firm* — Dan Swirsky; Alpha Patent Associated Ltd.

(57) ABSTRACT

A method for generating key information for mutual access among multiple computers, the method including configuring each of a plurality of computers to access common seed data, where the common seed data is the same for each of the computers, and configuring each of the computers to intercept a key generator request for computer-specific seed data and, in response to the request, provide the common seed data to the key generator in place of the computer-specific seed data, thereby enabling any of the computers to generate the same key information.

11 Claims, 2 Drawing Sheets

GENERATING KEY INFORMATION FOR MUTUAL ACCESS AMONG MULTIPLE COMPUTERS

FIELD OF THE INVENTION

The present invention relates to computer access security in general, and more particularly to key-based access protocols.

BACKGROUND OF THE INVENTION

Various computer security protocols have been developed to ensure secure communications between computers. In one configuration, two or more computers may communicate with each other using the SSH protocol, where a computer possesses the public key of another computer for encrypted communication with the other computer. For example, the DS6000™ Storage Controller, commercially available from International Business Machines Corporation, New Orchard Road, Armonk, N.Y., 10504, U.S.A., is built from two separate computing devices that sit in the same physical chassis and have access to a shared hardware memory area. The computers communicate with each other using SSH, where each computer possesses the other device's public key, allowing the computers to communicate without need for a password.

Adding or replacing one computer in a group of computers using password-less SSH requires that the new computer somehow acquire its own copies of the other computers' public keys. However, a public key cannot be passed to the new computer using password-less SSH because secure password-less SSH usage requires that the new computer already have the key. It is also not practical to preconfigure the new computer with necessary key information, as such computer additions or replacements often occur at different installation sites, each having different keys, and are often meant to be carried out by technicians on an off-the-shelf, plug-and-play basis.

SUMMARY OF THE INVENTION

The present invention discloses a system and method for generating key information for mutual access among multiple computers.

In one aspect of the present invention a method is provided for generating key information for mutual access among multiple computers, the method including configuring each of a plurality of computers to access common seed data, where the common seed data is the same for each of the computers, and configuring each of the computers to intercept a key generator request for computer-specific seed data and, in response to the request, provide the common seed data to the key generator in place of the computer-specific seed data, thereby enabling any of the computers to generate the same key information.

In another aspect of the present invention any of the configuring steps includes configuring each of the computers to access the common seed data from a shared memory external to each of the computers.

In another aspect of the present invention any of the configuring steps includes configuring the computers to access the shared memory at a plurality of physical locations.

In another aspect of the present invention any of the configuring steps includes configuring any of the computers to run the key generator under a wrapper program, configuring the wrapper to employ a trace mechanism to notify the wrapper when the key generator requests computer-specific seed data, and configuring the wrapper to provide the common seed data to the key generator responsive to the request.

In another aspect of the present invention a method is provided for generating key information for mutual access among multiple computers, the method including intercepting at a first computer a first key generator request for first-computer-specific seed data, providing common seed data to the first key generator in place of the first-computer-specific seed data, intercepting at a second computer a second key generator request for second-computer-specific seed data, and providing the common seed data to the second key generator in place of the second-computer-specific seed data, where the common seed data is the same for each of the computers In another aspect of the present invention any of the providing steps includes providing each of the computers with access to the common seed data from a shared memory external to each of the computers.

In another aspect of the present invention any of the providing steps includes providing each of the computers with access to the shared memory at a plurality of physical locations.

In another aspect of the present invention any of the intercepting steps includes running any of the key generators under a wrapper program, and employing a trace mechanism to notify the any of the wrapper programs when the key generator requests the computer-specific seed data.

In another aspect of the present invention a system is provided for generating key information for mutual access among multiple computers, the system including a plurality of key generators, a plurality of wrapper programs, where each of the key generators is operative to run under one of the wrapper programs, a plurality of trace mechanisms, where each of the trace mechanisms is associated with one of the wrapper programs and is operative to notify the associated wrapper program when its key generator requests computer-specific seed data, and where the wrapper program is operative to provide the common seed data to the key generator responsive to the request and in place of the computer-specific seed data, where the common seed data is the same for each of the computers, and a plurality of computers, where each of the computers is operative to host one of the key generators and its related wrapper program and associated trace mechanism.

In another aspect of the present invention any of the computers is operative to access the common seed data from a shared memory external to each of the computers.

In another aspect of the present invention any of the computers is operative to access the shared memory at a plurality of physical locations.

In another aspect of the present invention a computer-implemented program is provided embodied on a computer-readable medium, the computer program including a first code segment operative to intercept at a first computer a first key generator request for first-computer-specific seed data, a second code segment operative to provide common seed data to the first key generator in place of the first-computer-specific seed data, a third code segment operative to intercept at a second computer a second key generator request for second-computer-specific seed data, and a fourth code segment operative to provide the common seed data to the second key generator in place of the second-computer-specific seed data, where the common seed data is the same for each of the computers In another aspect of the present invention any of the segments is operative to provide each of the computers with access to the common seed data from a shared memory external to each of the computers.

In another aspect of the present invention any of the segments is operative to provide each of the computers with access to the shared memory at a plurality of physical locations.

In another aspect of the present invention the computer-implemented program further includes a wrapper program code segment operative to run any of the key generators, and a trace mechanism code segment operative to notify the wrapper program code segment when any of the key generators requests the computer-specific seed data.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
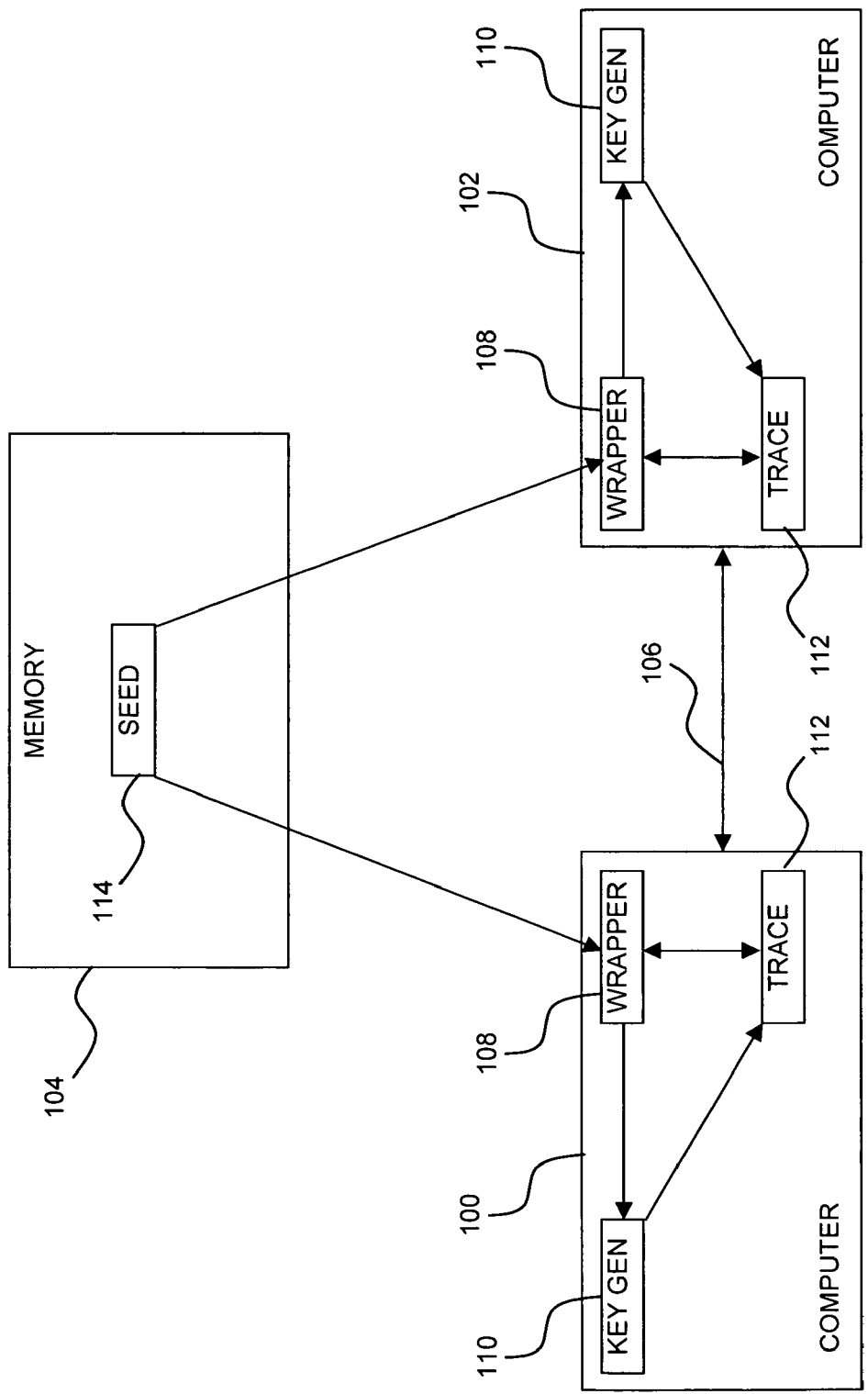
FIG. 1 is a simplified block diagram of a system for generating key information for mutual access among multiple computers, constructed and operative in accordance with a preferred embodiment of the present invention.
Figure 2:
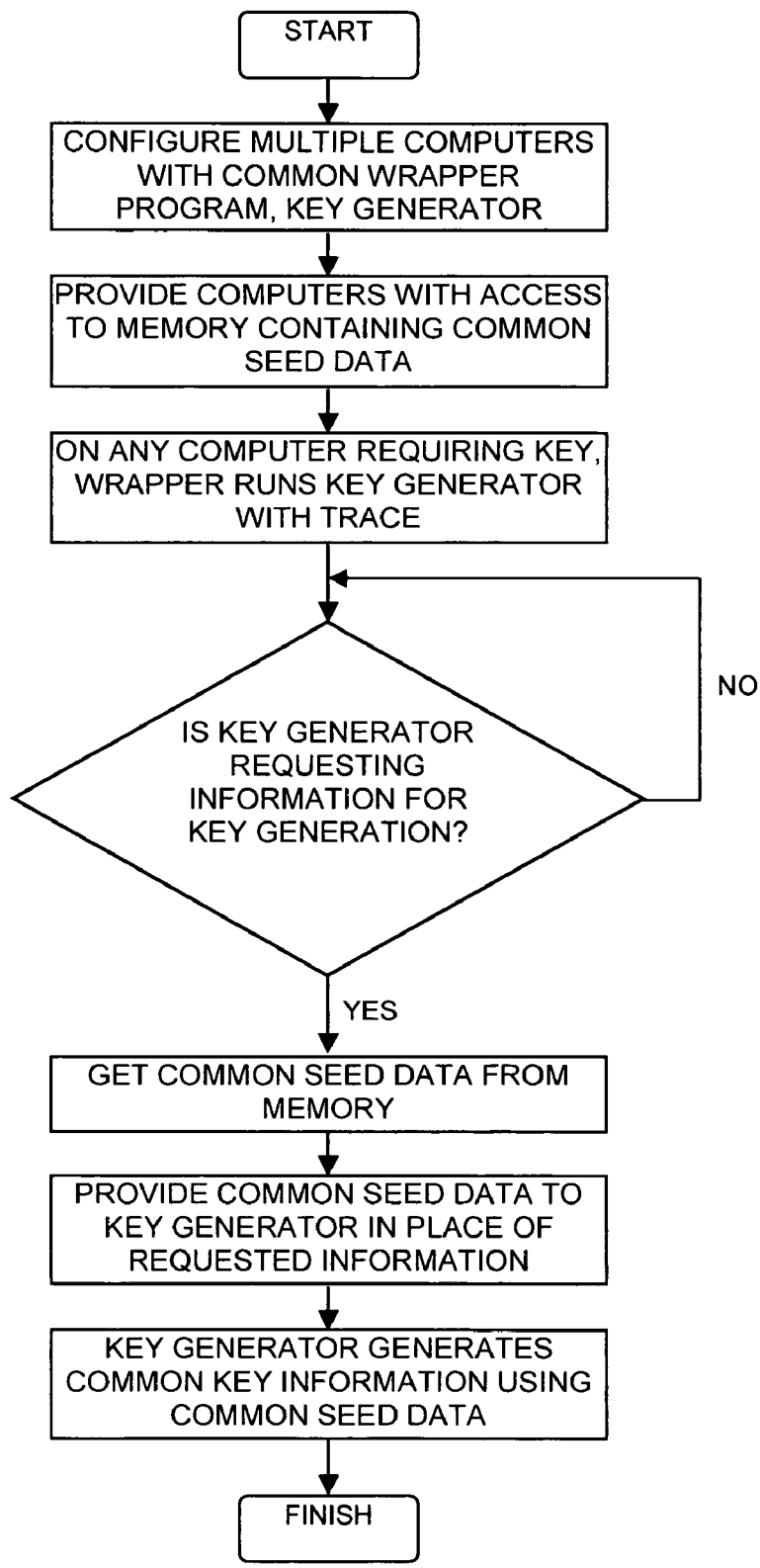
FIG. 2 is a simplified flowchart illustration of an exemplary method of operation of the system of FIG. 1, operative in accordance with a preferred embodiment of the present invention.

Reference is now made to FIG. 1, which is a simplified block diagram of a system for generating key information for mutual access among multiple computers, constructed and operative in accordance with a preferred embodiment of the present invention, and to FIG. 2, which is a simplified flowchart illustration of an exemplary method of operation of the system of FIG. 1, operative in accordance with a preferred embodiment of the present invention. In the system of FIG. 1 and method of FIG. 2, two computers, 100 and 102, are shown accessing a memory 104, although the present invention is equally applicable for any number of computers accessing memory 104. Memory 104 may be any type of computer memory or data storage medium, and may be a single physical memory/storage unit shared by computers 100 and 102, or different physical memory/storage units which represent "shared" memory in the sense that at least some stored data is common to each of the units and is preferably found at the same locations on each of the units. Computers 100 and 102 are configured for secure communication with one another, such that each computer must possess the other computer's key information for encrypted communications with its counterpart via a communications channel 106, such as by employing SSH where each computer employs the same public/private key pair. For illustration purposes, it will be assumed that neither computer 100 nor computer 102 possesses the necessary key information for secure communications, although the present invention is equally operative where one computer currently possesses the necessary key information, whereas the other computer does not.

In order to acquire the necessary key information for secure communications, both computers 100 and 102 are configured to run a wrapper program 108 which in turn calls a key generation program 110, such as ssh-keygen, which is typically available as part of most UNIX-based systems. Wrapper 108 also uses a trace mechanism 112, such as the ptrace( ) API, to receive notification whenever key generator 110 requests or attempts to access computer-specific data, such as the current time, or the contents of an uninitialized stack variable, which key generator 110 may use to generate key information. Upon receiving such notification from trace mechanism 112, wrapper 108 responds by providing common seed data 114 from memory 104 in place of the computer-specific seed data that would have otherwise been provided to key generator 110. For example, if trace mechanism 112 detects a system call related to gathering data from the operating system environment, such as may indicate that key generator 110 is about to generate key information by requesting a randomization seed, it signals wrapper 108 which responds to the system call by providing common seed data 114 from memory 104. Common seed data 114 represents data that each copy of key generator 110, running separately on computers 100 and 102, receives, typically from the same location in memory 104. Thus, since both computers 100 and 102 run the same copy of key generator 110, which in turn receives the same common seed data 114 in place of different seed data specific to each computer, key generator 110 generates the same key information on both computers 100 and 102. Computers 100 and 102 may then securely communicate with each other, such as by using SSH without need for a separate password.

It is appreciated that different types of computer-specific seed data requests from key generator 110 may be provided with different instances of common seed data 114, provided that the same type of request from key generator 110 on different computers receives the same instance of common seed data 114.

It will be seen that the same key information may be generated when replacing either or both of computers 100 and 102, or adding an additional computer, provided that the replacement or additional computer possesses the same wrapper 108 and key generator 110 and also accesses memory 104 in order to receive common seed data 114. It will also be seen that a common key generation program, ssh-keygen, may be used without modification in accordance with the present invention to generate the same public/private key pairs-on different computers.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for generating key information for mutual access among multiple computers, the method comprising:
configuring each of a first computer and a second computer to access a data storage location that is external to both of said computers;
configuring said first computer to
detect a request by a first key generator at said first computer for key generation seed data maintained at said first computer, and upon detecting said request by said first key generator, provide seed data from said data storage location to said first key generator; and configuring said second computer to detect a request by a second key generator at said second computer for key generation seed data maintained at said second computer, and upon detecting said request by said second key generator, provide said seed data from said data storage location to said second key generator, thereby enabling both of said computers to generate the same key information using the same seed data from said data storage location.

2. A method according to claim 1 wherein any of said configuring steps comprises configuring said computers to access said shared memory at a plurality of physical locations.

3. A method according to claim 1 wherein any of said configuring steps comprises:

configuring any of said computers to run said key generator under a wrapper program;

configuring said wrapper program to employ a trace mechanism to notify said wrapper program when said key generator requests said seed data maintained at said computer where said key generator request occurs; and configuring said wrapper program to provide said seed data from said data storage location to said key generator responsive to said request.

4. A method for generating key information for mutual access among multiple computers, the method comprising:

configuring each of a first computer and a second computer to access a data storage location that is external to both of said computers;

intercepting at said first computer a first key generator request for seed data maintained at said first computer;

providing seed data from said data storage location to said first key generator in place of said seed data maintained at said first computer;

intercepting at said second computer a second key generator request for seed data maintained at said second computer; and providing said seed data from said data storage location to said second key generator in place of said seed data maintained at said second computer, wherein said seed data from said data storage location is the same for each of said computers.

5. A method according to claim 4 wherein any of said providing steps comprises providing each of said computers with access to said shared memory at a plurality of physical locations.

6. A method according to claim 4 wherein any of said intercepting steps comprises:

running any of said key generators under a wrapper program; and employing a trace mechanism to notify said any of said wrapper programs when said key generator requests said seed data maintained at said computer where said intercepting step occurs.

7. A system for generating key information for mutual access among multiple computers, the system comprising:

a shared memory;

a first computer configured to host a first wrapper program, a first key generator configured to run under said first wrapper program, and a first trace mechanism associated with said first wrapper program and configured to notify said first wrapper program when said first key generator requests seed data maintained at said first computer, wherein said first wrapper program is configured to provide seed data accessed from said shared memory to said first key generator responsive to said first key generator request and in place of said seed data maintained at said first computer; and a second computer configured to host a second wrapper program, a second key generator configured to run under said second wrapper program, and a second trace mechanism associated with said second wrapper program and configured to notify said second wrapper program when said second key generator requests seed data maintained at said second computer, wherein said second wrapper program is configured to provide said seed data accessed from said shared memory to said second key generator responsive to said second key generator request and in place of said seed data maintained at said second computer.

8. A system according to claim 7 wherein any of said computers is operative to access said shared memory at a plurality of physical locations.

9. A computer program product comprising:

a non-transitory computer usable storage medium including a computer readable program, wherein said computer readable program when executed on a first computer causes said first computer to access a data storage location that is external to said first computer, detect a request by a first key generator at said first computer for key generation seed data maintained at said first computer, and upon detecting said request by said first key generator, provide seed data from said data storage location to said first key generator, and wherein said computer readable program when executed on a second computer causes said second computer to access said data storage location that is external to said second computer, detect a request by a second key generator at said second computer for key generation seed data maintained at said second computer, and upon detecting said request by said second key generator, provide said seed data from said data storage location to said second key generator, wherein said seed data from said data storage location is the same for each of said computers.

10. A computer-implemented program according to claim 9 wherein any of said computer readable programs cause any of said computers to access said shared memory at a plurality of physical locations.

11. A computer-implemented program according to claim 9 and further comprising:

a wrapper program code segment operative to run any of said key generators; and a trace mechanism code segment operative to notify said wrapper program code segment when any of said key generators requests said seed data maintained at said computer executing said computer-implemented program.

* * * * *